United States Patent
Heddleson et al.

(10) Patent No.: US 10,163,154 B2
(45) Date of Patent: Dec. 25, 2018

(54) OLED ("ORGANIC LIGHT EMITTING DIODE") TELLER WINDOWS

(71) Applicant: Bank of America Corporation, Charlotte, NC (US)

(72) Inventors: James M. Heddleson, Charlotte, NC (US); Willard H. Waldron, III, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 368 days.

(21) Appl. No.: 15/187,972

(22) Filed: Jun. 21, 2016

(65) Prior Publication Data

US 2017/0364997 A1 Dec. 21, 2017

(51) Int. Cl.
*G09G 3/3208* (2016.01)
*G06Q 40/02* (2012.01)
(Continued)

(52) U.S. Cl.
CPC .............. *G06Q 40/02* (2013.01); *E04H 1/06* (2013.01); *E04H 14/00* (2013.01); *G06Q 20/108* (2013.01);
(Continued)

(58) Field of Classification Search
CPC ........ H01L 27/3267; E04H 1/06; E04H 14/00
See application file for complete search history.

(56) References Cited

U.S. PATENT DOCUMENTS 2,912,066 A * 11/1959 Ellithorpe ................. A47F 9/02
109/10
3,703,864 A 11/1972 Bradford
(Continued)

FOREIGN PATENT DOCUMENTS

DE 102009028991 5/2011
EP 0827066 3/1998
WO WO2013131153 9/2013

OTHER PUBLICATIONS

Conor Gaffey, "World's Smallest Nano Chip will Double Processing Power of Smartphones," Jun. 9, 2015, 2 pages.
(Continued)

*Primary Examiner* — Dorothy Harris
(74) *Attorney, Agent, or Firm* — Weiss & Arons LLP; Michael A. Springs, Esq.

(57) ABSTRACT

A four-pane, two-sided OLED teller window is provided. The teller window may include a first OLED pane, a second OLED pane, a third OLED pane, a fourth OLED pane, a first configurably-opaque layer and a second configurably-opaque layer. The first OLED pane may face a first direction. The third OLED pane may face a second direction. The first direction and the second direction may be substantially opposite directions. The first configurably-opaque layer may be located in between the first OLED pane and the third OLED pane. The second OLED pane may face the first direction. The fourth OLED pane may face the second direction. The second configurably-opaque layer may be located in between the second OLED pane and the fourth OLED pane. The first OLED pane and the second OLED pane may be situated side-by-side. The third OLED pane and the fourth OLED pane may be situation side-by-side.

15 Claims, 9 Drawing Sheets

(51) Int. Cl.
  *H01L 27/32* (2006.01)
  *H01L 51/52* (2006.01)
  *G06Q 20/10* (2012.01)
  *E04H 1/06* (2006.01)
  *E04H 14/00* (2006.01)

(52) U.S. Cl.
  CPC ...... *H01L 27/3267* (2013.01); *H01L 51/5253* (2013.01)

(56) References Cited

U.S. PATENT DOCUMENTS

| | | | |
|---|---|---|---|
| 3,946,206 A | 3/1976 | Darjany | |
| 4,372,225 A * | 2/1983 | Tissot | E05G 7/004 109/19 |
| 4,557,352 A * | 12/1985 | Tschappat, Jr. | E04H 1/06 109/11 |
| 4,953,326 A * | 9/1990 | Wexler | E04H 14/00 186/37 |
| 4,968,873 A | 11/1990 | Dethloff et al. | |
| 5,168,354 A * | 12/1992 | Martinez | H04N 7/144 348/150 |
| 5,313,051 A | 5/1994 | Brigida et al. | |
| 5,539,819 A | 7/1996 | Sonoyama et al. | |
| 5,693,956 A | 12/1997 | Shi et al. | |
| 5,734,154 A | 3/1998 | Jachimowicz et al. | |
| 5,770,849 A | 6/1998 | Novis et al. | |
| 5,970,888 A * | 10/1999 | Sheppard | E05G 7/008 109/10 |
| 6,015,092 A | 1/2000 | Postlewaite et al. | |
| 6,057,646 A | 5/2000 | Pieroth et al. | |
| 6,173,899 B1 | 1/2001 | Rozin | |
| 6,394,343 B1 | 5/2002 | Berg et al. | |
| 6,724,103 B2 | 4/2004 | Parrault | |
| 7,025,277 B2 | 4/2006 | Forrest et al. | |
| 7,270,276 B2 | 9/2007 | Vayssiere | |
| 7,357,315 B2 * | 4/2008 | Vergara | A47C 9/002 186/37 |
| 7,360,682 B2 | 4/2008 | Shane et al. | |
| 7,360,691 B2 | 4/2008 | Takayama | |
| 7,523,856 B2 | 4/2009 | Block et al. | |
| 7,588,183 B2 | 9/2009 | Shane et al. | |
| 7,791,559 B2 | 9/2010 | Piasecki | |
| 7,814,016 B2 | 10/2010 | Pranger | |
| 7,856,116 B2 | 12/2010 | Rodriguez et al. | |
| 7,940,159 B2 | 5/2011 | Clemens et al. | |
| 7,992,789 B2 | 8/2011 | Borracci | |
| 8,237,068 B2 | 8/2012 | Szaikowski | |
| 8,276,823 B2 | 10/2012 | Chen | |
| 8,282,007 B1 | 10/2012 | Cloutier et al. | |
| 8,317,094 B2 | 11/2012 | Lehman | |
| 8,378,932 B2 | 2/2013 | Fein et al. | |
| 8,392,965 B2 | 3/2013 | Carter et al. | |
| 8,413,893 B2 | 4/2013 | Kim | |
| 8,471,782 B2 | 6/2013 | Muklashy et al. | |
| 8,479,981 B2 | 7/2013 | Carmichael et al. | |
| 8,399,889 B2 | 9/2013 | Wu et al. | |
| 8,523,059 B1 | 9/2013 | Mullen et al. | |
| 8,540,151 B1 | 9/2013 | Snyder et al. | |
| 8,678,293 B2 | 3/2014 | Chen | |
| 8,756,680 B2 | 6/2014 | Shashidhar | |
| 8,810,816 B2 | 8/2014 | Fischer et al. | |
| 8,820,638 B1 | 9/2014 | Cotter et al. | |
| 9,250,657 B2 | 2/2016 | Kim et al. | |
| 9,470,404 B2 | 10/2016 | Lee et al. | |
| 9,491,879 B2 | 11/2016 | Cheng et al. | |
| 9,538,127 B2 * | 1/2017 | Gish | H04N 7/141 |
| 9,577,216 B2 | 2/2017 | Fujino et al. | |
| 10,056,048 B2 * | 8/2018 | Kim | G02B 6/0016 |
| 2001/0007332 A1 * | 7/2001 | Kjonaas | G06Q 10/10 235/379 |
| 2003/0145205 A1 | 7/2003 | Sarcanin | |
| 2003/0208405 A1 * | 11/2003 | Putman | G06Q 20/108 705/16 |
| 2005/0064936 A1 | 3/2005 | Pryor | |
| 2005/0102499 A1 | 5/2005 | Kosuga et al. | |
| 2005/0134461 A1 | 6/2005 | Gelbman et al. | |
| 2005/0173518 A1 | 8/2005 | Takayama | |
| 2005/0263590 A1 * | 12/2005 | Branck | G07G 1/0018 235/383 |
| 2006/0016884 A1 | 1/2006 | Block et al. | |
| 2006/0091223 A1 | 5/2006 | Zellner et al. | |
| 2006/0131393 A1 | 6/2006 | Cok et al. | |
| 2006/0261174 A1 | 11/2006 | Zellner et al. | |
| 2006/0289629 A1 * | 12/2006 | Smith | G06Q 40/00 235/379 |
| 2007/0115202 A1 * | 5/2007 | Kiesenhofer | G06F 1/1616 345/1.1 |
| 2007/0273507 A1 | 11/2007 | Burchell et al. | |
| 2007/0279315 A1 | 12/2007 | Laves et al. | |
| 2008/0035736 A1 | 2/2008 | Tompkin et al. | |
| 2008/0105751 A1 | 5/2008 | Landau | |
| 2008/0158150 A1 | 7/2008 | Rossman et al. | |
| 2009/0039154 A1 | 2/2009 | Williams et al. | |
| 2009/0278452 A1 * | 11/2009 | Kim | H01L 25/048 313/504 |
| 2009/0314840 A1 | 12/2009 | Granucci et al. | |
| 2010/0084476 A1 | 4/2010 | Zellner et al. | |
| 2010/0260388 A1 | 10/2010 | Garrett et al. | |
| 2010/0302206 A1 | 12/2010 | Yu et al. | |
| 2011/0058113 A1 * | 3/2011 | Threlkel | E06B 9/24 349/1 |
| 2011/0060640 A1 | 3/2011 | Thompson et al. | |
| 2011/0140841 A1 | 6/2011 | Bona et al. | |
| 2011/0148944 A1 * | 6/2011 | Kobayashi | G09G 3/3225 345/690 |
| 2011/0164047 A1 * | 7/2011 | Pance | G06F 1/1647 345/581 |
| 2011/0178928 A1 | 7/2011 | Carmichael et al. | |
| 2011/0241996 A1 | 10/2011 | Vesely | |
| 2012/0019434 A1 * | 1/2012 | Kuhlman | G02F 1/13306 345/1.3 |
| 2012/0280924 A1 | 11/2012 | Kummer et al. | |
| 2013/0162594 A1 | 6/2013 | Paulsen et al. | |
| 2013/0221112 A1 | 8/2013 | Lai et al. | |
| 2013/0232082 A1 | 9/2013 | Krawczewicz et al. | |
| 2013/0341394 A1 | 12/2013 | Seo et al. | |
| 2014/0007002 A1 | 1/2014 | Chang et al. | |
| 2014/0081729 A1 | 3/2014 | Ocher | |
| 2014/0093144 A1 | 4/2014 | Feekes | |
| 2014/0114861 A1 | 4/2014 | Mages et al. | |
| 2014/0118415 A1 | 5/2014 | Seo | |
| 2014/0172700 A1 | 6/2014 | Teuwen et al. | |
| 2014/0226275 A1 | 8/2014 | Ko et al. | |
| 2014/0267960 A1 * | 9/2014 | Ward | G02B 27/26 349/15 |
| 2014/0291406 A1 | 10/2014 | Ko | |
| 2014/0337957 A1 | 11/2014 | Feekes | |
| 2014/0339315 A1 | 11/2014 | Ko | |
| 2014/0353384 A1 | 12/2014 | Hoegerl et al. | |
| 2014/0374494 A1 | 12/2014 | Seo | |
| 2015/0069126 A1 | 3/2015 | Leon | |
| 2015/0077646 A1 | 3/2015 | Chen et al. | |
| 2015/0179025 A1 * | 6/2015 | Cowell | E05G 7/00 109/10 |
| 2015/0262052 A1 | 9/2015 | Pahuja | |
| 2016/0004945 A1 | 1/2016 | Wade | |
| 2016/0027391 A1 * | 1/2016 | Gibson | G02B 6/0063 345/690 |
| 2016/0054479 A1 | 2/2016 | Ho et al. | |
| 2016/0085325 A1 | 3/2016 | Lee et al. | |
| 2016/0098709 A1 * | 4/2016 | Johnson | G06Q 20/1085 705/43 |
| 2016/0171461 A1 * | 6/2016 | Hoover | G06F 3/0488 705/43 |
| 2016/0210453 A1 | 7/2016 | Seo et al. | |
| 2016/0224528 A1 | 8/2016 | Trevarthen et al. | |
| 2016/0254336 A1 * | 9/2016 | Zhang | G02F 1/134309 349/33 |
| 2016/0307089 A1 | 10/2016 | Wurmfeld et al. | |
| 2017/0103718 A1 * | 4/2017 | Miller | G02F 1/13338 |
| 2017/0357979 A1 | 12/2017 | Khurana et al. | |

(56) References Cited

U.S. PATENT DOCUMENTS

OTHER PUBLICATIONS http://www.us.schott.com/innovation/ultrathinglass/, Retrieved on Sep. 14, 2016, 7 pages.
"Schott's Reliable and Strong Ultra-Thin Glass Features in Fingerprint Sensors in new Smartphones," Retrieved on Sep. 14, 2016, 3 pages.
Ron Mertens, "The OLED Handbook, A Guide to OLED Technology, Industry & Market," 2015 Edition, 139 pages.
Bryce Kellogg, Vamsi Tana, Shyamnath Gollakota and Joshua R. Smith, "Passive Wi-Fi: Bringing Low Power to Wi-Fi Transmissions," Retrieved on May 11, 2016, 14 pages.
Ron Mertens, SecureCard—A New Secure Credit Card Technology, Utilizing an OLED Display, Nov. 21, 2006, Metalgrass Software, 3 pages.
John Wehr, "Card Size Specifications: When Does Card Size Matter?" Jan. 1, 2002, 7 pages.
Zachary Shahan, "Ultra-Thin-Solar-Cell Company Unstealths, Aims to Cut Cost of Solar Cells in Half!" Mar. 14, 2012, Sustainable Enterprises Media, Inc., 5 pages.
"ISO Magnetic Stripe Card Standards," Retrieved on Jul. 18, 2016, 3 pages.
"Coin Vs. Plastic: Which Credit Card Consolidation Tool is the Best?" Retrieved on Apr. 7, 2016, PayProTec., 5 pages.
"Tiny Batteries Could Revolutionize Green Energy," Retrieved on Apr. 5, 2016, National Geographic Society, 8 pages.
"Yubikey 4 & Yubikey 4 Nano," Retrieved on Apr. 7, 2016, Yubico, 9 pages.
"Magnetic Stripe Card Standards," Retrieved on Apr. 20, 2016, MagTek Inc., Seal Beach, California, 2 pages.
"A Power-Harvesting Pad-Less mm-sized 24/60GHz Passive Radio With On-Chip Antennas," Retrieved on Apr. 19, 2016, IEEE, 2 pages.
"Magnetic Stripe Card Recommendations," Retrieved on Apr. 20, 2016, 2 pages.
"Plastic Card Manufacturing Including Magnetic Stripe Tapelaying," Retrieved on Apr. 20, 2016, 3 pages.
Paul Buckley, "Flexible OLED Displays Target Volume Production in 2015," Feb. 5, 2015, 2 pages.
"MAX2837—2.3GHz to 2.7GHz Wireless Broadband RF Transceiver," Retrieved on May 30, 2016, Maxim Integrated, 4 pages.
"Ultrathin Rechargeable Lithium Polymer Batteries from PowerStream," Apr. 5, 2016, Lund Instrument Engineering, Inc., 4 pages.
Tom Abate, "Stanford Engineers Aim to Connect the World with Ant-Sized Radios," Sep. 9, 2014, Stanford University, Stanford California, 5 pages.
http://www.schott.com/advanced_optics/english/syn/advanced_optics/products/wafers-and-thin-glass/glass-wafer-and-substrates/ultra-thin-glass/index.html, Retrieved on May 30, 2016, 2 pages.
Jennifer Langston, "UW Engineers Achieve Wi-Fi at 10,000 Times Lower Power," Feb. 23, 2016, 6 pages.
Ron Mertens, "New All-in-One Credit Card Concept," Oct. 29, 2009, Metalgrass Software, 3 pages.
"Wi-Fi," Apr. 12, 2016, Wikimedia Foundation, Inc., 16 pages.
"Ant-Sized IoT Radio," Retrieved on Jul. 18, 2016, 3 pages.
Nick Pino, "Samsung's Latest OLED Can be a Mirror, a Window, or a TV," Jun. 11, 2015, Future US, Inc., San Francisco, California, 6 pages.
"Pneumatic Tube,"0 Mar. 11, 2016, Wikimedia Foundation, Inc., 10 pages.
"New Virtual Tellers," Retrieved on Jun. 6, 2016, Frontier Bank, 2 pages.
Dario Borghino, "High-Tech Light Shutter Could Help Turn Your Windows into LCD Displays," May 1, 2015, Gizmag, 4 pages.
L. Zhao et al. "Novel Method for Fabricating Flexible Active Matrix Organic Light Emitting Diode (AMOLED) Displays," Sep. 21, 2011, Hewlett-Packard Development Company, L.P., 5 pages.
Amar Toor, "LG Unveils Flexible Plastic E-paper Display, Aims for European Launch Next Month," Mar. 29, 2012, 2 pages.
Martyn Williams, "Samsung, LG Show Flexible OLED, E-Paper Screens," Nov. 10, 2010, 2 pages.
"Electronic Paper," Jun. 10, 2016, Wikimedia Foundation, Inc., 10 pages.
"E Ink," Jun. 8, 2016, Wikimedia Foundation, Inc., 6 pages.
"Ink Technology: Electrophoretic Ink, Explained," Retrieved on Jun. 20, 2016, E Ink Holdings, Inc., 4 pages.
"Are Toeprints Unique, Like Fingerprints?" Retrieved on Jun. 23, 2016, 1 page.
Sampath Srinivas, Dirk Balfanz, Eric Tiffany, Alexi Czeskis, "Universal $2^{nd}$ Factor (U2F) Overview", May 14, 2016, FIDO Alliance, 16 pages.
"Sonavation Announces Fingerprint Imaging Through Smart Phone OLED Display," Feb. 22, 2016, 2 pages.
Dario Borghino, "Wearable Thermoelectric Generator Could Extend Your Smartwatch's Battery Life", Apr. 14, 2014, Gizmag, 5 pages.
"Inductive Charging", May 6, 2016, Wikimedia Foundation, Inc., 6 pages.
"Near Field Communication", Apr. 29, 2016, Wikimedia Foundation, Inc., 13 pages.
Sumi Das, "A Keyboard that Rises Up From Flat Touch Screens," Feb. 13, 2013, 2 pages.
Jessica Leber, "A Shape-Shifting Smartphone Touch Screen," Dec. 3, 2012, 4 pages.
Matthew Frankel, "Could This Be the Bank of the Future?" Nov. 9, 2014, 7 pages.
"Contactless Payment," Jul. 27, 2016, Wikimedia Foundation, Inc., 6 pages.
Zhiquin Chen, "Java Card Technology for Smart Cards: Architecture and Programmer's Guide," pp. 11-14, Copyright 2000, Sun Microsystems, Inc., Palo Alto, California.

\* cited by examiner

OLED ("ORGANIC LIGHT EMITTING DIODE") TELLER WINDOWS

FIELD OF THE INVENTION

This invention relates to teller windows.

BACKGROUND OF THE INVENTION

A teller window is a piece of glass, or other suitable substrate, that sits between a customer and a teller. In addition to enabling visual contact between the teller and the customer, teller windows also serve as a security barrier between a customer and a bank teller.

Teller windows may be located internal to—e.g., at a teller booth above a half-wall between a teller and customer, to enable visual contact between a teller situated inside a financial institution and a customer situated inside the financial institution—or external to—e.g., located on an external wall of a financial institution, to enable visual contact between a teller situated inside the financial institution and a customer situated outside the financial institution—a financial institution. External teller windows may be located on an external wall of a financial institution. External teller windows may serve as drive-up facilities in financial institutions.

Internal teller windows may be located inside financial institutions, at teller counters. At times, these windows reach from the ceiling to the teller counter. Other times, these windows may reach from the teller counter to the height of an average teller.

Sometimes, during a customer/teller transaction, a remote specialist may be required to complete the transaction. Other times, a teller may want to show transaction details to a customer while the transaction is being performed.

Therefore, it may be desirable for a teller window to be an OLED teller window.

SUMMARY OF THE DISCLOSURE

A method for enabling an OLED, drive-up, two-sided teller window is provided. The method may include establishing an initiation state. During the initiation state, the teller window may be transparent.

The method may also include detecting a car at the OLED, drive-up, teller window. The detection of the car may change the state of the window.

The method may include receiving banking information from a user of the car. The receipt of information may occur at the OLED, drive-up, teller window. The receipt of information may be via a pass-thru transaction drawer.

The method may include powering on a first portion of the OLED, drive-up teller window. The first portion may display transaction information. The transaction information may be associated with the user of the car.

The method may also include maintaining transparency of a second portion of the OLED, drive-up, teller window. The transparent second portion may enable a teller, located on a side of the window opposite from the user, to make visual contact with the user.

When a teller is unavailable, a user-side of the second portion may be powered on. The user-side of the second portion may display a remote teller. The remote teller may communicate with the user via audio and/or video input, such as Skype™, or any other similar technology.

The teller-side of the second portion may be powered on. The teller-side of the second portion may be used as a banking portal computer screen.

A teller may be able to toggle between viewing the computer screen on the second portion and viewing the user through the second portion.

A configurably-opaque layer may sit between the user-side and the teller-side of the two sided window. The configurably-opaque layer may be transparent when idle. Upon powering on of a user-side of the two-sided window and upon powering on of the teller-side of the two-sided window, the configurably-opaque layer may be powered on.

A user-side of the first portion may be configured to display a remote specialist to the user. A teller-side of the first portion may be configured to display the remote specialist to the teller.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 11 shows an illustrative cut-away view of two OLED panes with a configurably-opaque layer in between.

DETAILED DESCRIPTION OF THE DISCLOSURE

Figure 1:
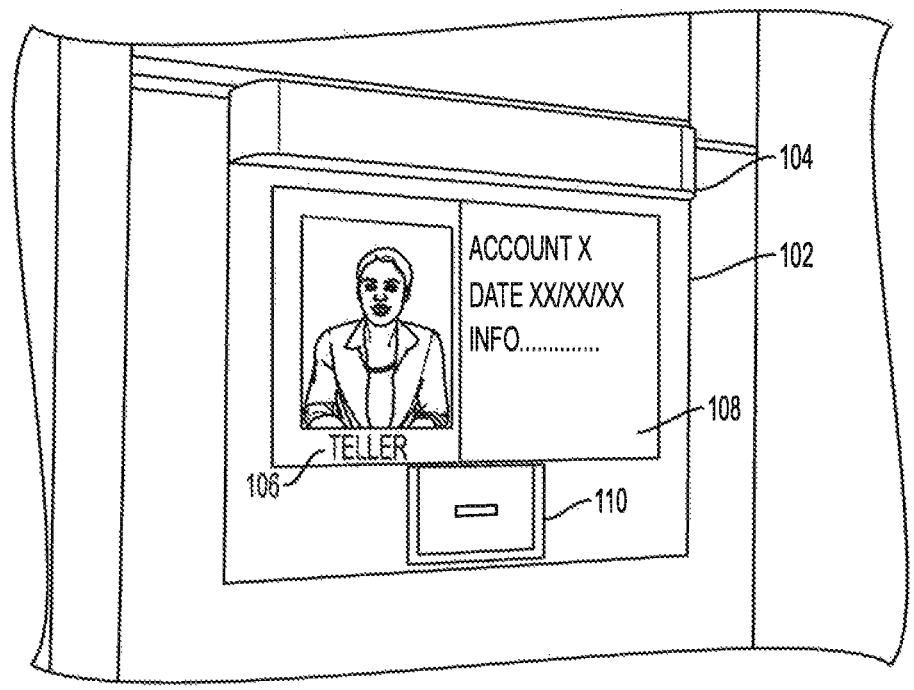
FIG. 1 shows an illustrative external teller window according to certain embodiments.

A method for enabling a four-pane, two-sided OLED window in a teller booth is provided. The four panes of the OLED window may be visible panes. The method may include establishing an initiation state. During the initiation state, the four panes of the OLED window may be transparent.

In some embodiments, during the initiation state, the two user-side panes may display advertisements.

The method may also include receiving banking information from a human being at a first pane of the OLED window. The banking information may be stored in the form of a debit card, bank card, deposit slip, withdrawal slip or any other suitable banking information.

The method may also include powering on a second pane of the OLED window. The second pane may be side-by-side with the first pane. The second pane may display transaction information to the human being. The transaction information may be associated with a transaction associated with the human being.

The method may also include enabling the first pane and a third pane to remain transparent to enable a teller to make visual contact with the human being. The third pane may be located in the rear of the first pane. The teller may be located on a side of a window opposite from the human being.

The method may also include powering on a fourth pane. The fourth pane may be located in the rear of the second pane. The fourth pane may display transaction information to the teller.

In some embodiments, the panes may be moveable. In these embodiments, a teller, or customer, may be able to roll one, or otherwise shift one or more panes and block the view of another pane. This may be the case when a customer or teller hands over documentation to the opposite party.

In certain embodiments, the first pane may be powered on. At times, a teller may be unavailable. Therefore, the first pane may display a remote teller. The remote teller may communicate via audio and/or visual input with the human being. The remote teller may perform the actions of a teller. The remote teller may be able to assist the human being to complete a transaction.

In some embodiments, the method may also include powering on a first configurably-opaque layer. The first configurably-opaque layer may sit between the first pane and the third pane. The first configurably-opaque layer may be powered on when both the first pane and the third pane are powered on. When powered on, the configurably-opaque layer may be opaque. Without power, the configurably-opaque layer may be transparent. The configurably-opaque layer may ensure that the display of the first pane and the display of the third pane do not interfere with each other—i.e., the teller-side can only view the third pane and the customer-side can only view the first pane.

In some embodiments, powering on the first configurably-opaque layer may depend on powering on either the first pane or the third pane.

In other embodiments, if both the first pane and the third pane are powered off, the configurably-opaque layer may be powered on. This may ensure privacy of the teller booth when a teller is present but unavailable. This may enable a teller to remain in a teller booth and not be available to assist or be visible to customers. Previously, when a teller was at his booth, customers would be able to view the teller and the customers would assume that the teller was available. The configurably-opaque layer may enable the teller to do paper work, eat lunch, or any other suitable action, at his teller booth, with privacy.

In other embodiments, a first configurably-opaque layer may be unnecessary. In these embodiments, when powered on, the OLED panes themselves may serve as a barrier and do not interfere with each other.

The method may also include powering on a second configurably-opaque layer. The second configurably-opaque layer may sit between the second pane and the fourth pane. Powering on of the second configurably-opaque layer may be dependent on the powering on of both the second pane and the fourth pane. In some embodiments, powering on the second configurably-opaque layer may be dependent on powering on either the second pane or the fourth pane.

In other embodiments, if both the second pane and the fourth pane are powered off, the configurably-opaque layer may be powered on. This may be to ensure privacy of the teller booth when the teller is unavailable.

In other embodiments, a second configurably-opaque layer may be unnecessary. In these embodiments, when powered on, the OLED panes themselves may serve as a barrier and do not interfere with each other.

In some embodiments, the fourth pane may be powered on and utilized as a computer screen.

In other embodiments, the teller can toggle between viewing the computer screen on the fourth pane and viewing the human being through the fourth pane. The toggling may be accomplished by powering on or off the configurably-opaque layer.

In yet other embodiments, the second pane may be configured to display a remote specialist to the human being. The fourth pane may be configured to display the remote specialist to the teller. At times, it may only be necessary for the teller to view the remote specialist. Other times, it may only be necessary for the human being to view the remote specialist. Other times, it may be necessary for both the teller and the human being to view the remote specialist.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative external OLED teller window 102. A customer may drive up to teller window 102. A teller (shown in 106) may make visual contact with a customer. The customer may want to perform a transaction. The customer may utilize pass-thru transaction drawer 110 to transmit and receive documentation from the teller. Light 104 may illuminate the teller window when necessary.

The teller may want to display transaction information to the customer. Therefore, OLED pane 108 may be powered on and display the information to the customer. It may be preferable that the OLED screen has glare-reducing properties to block glare-causing light.

The OLED screen may also include observation reduction abilities. Such abilities may preferably reduce the viewing cone that is associated with the display. They may make an image seem garbled, poorly saturated, or poor contrast, blurry or too faint outside a desired viewing angle range. For example, some screens reflect more light perpendicular to the screen and less light to the sides, making the screen appear much darker if the viewer is not in front of the screen.

The OLED pane 106 may remain transparent throughout the session to ensure communication and visual contact between the customer and the teller.

Figure 2:
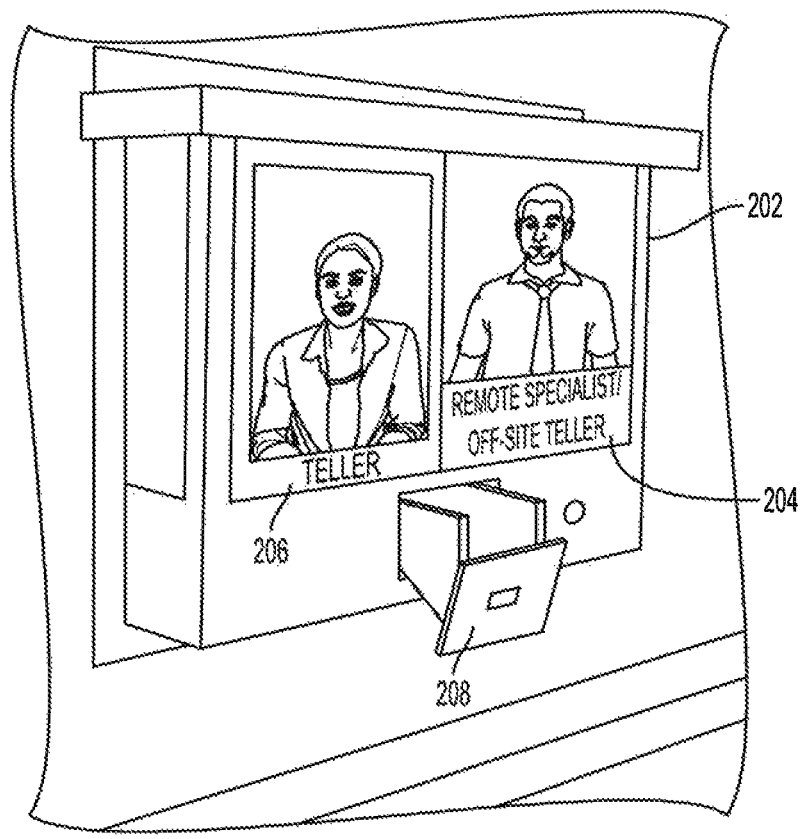
FIG. 2 shows another illustrative external teller window according to certain embodiments.

FIG. 2 shows another illustrative external OLED teller window. Window 202 may include OLED panes 204 and 206. A customer may transfer and receive documentation via pass-thru transaction drawer 208.

During a communication with the teller, a customer may wish to speak with a specialist or a supervisor. At times, a specialist or supervisor may be unavailable at the physical location of teller window 202. Therefore, the teller may power on OLED pane 204. A virtual specialist or supervisor may communicate with the customer, via OLED pane 204. The virtual specialist or supervisor may also communicate with the teller via an OLED pane (not shown) that backs up to OLED pane 204.

Also, at times a physical teller may be unavailable to assist a customer. Therefore, OLED pane 206 and/or OLED pane 204 may be powered on to display a remote teller which may assist a customer perform his desired transaction.

Figure 3:
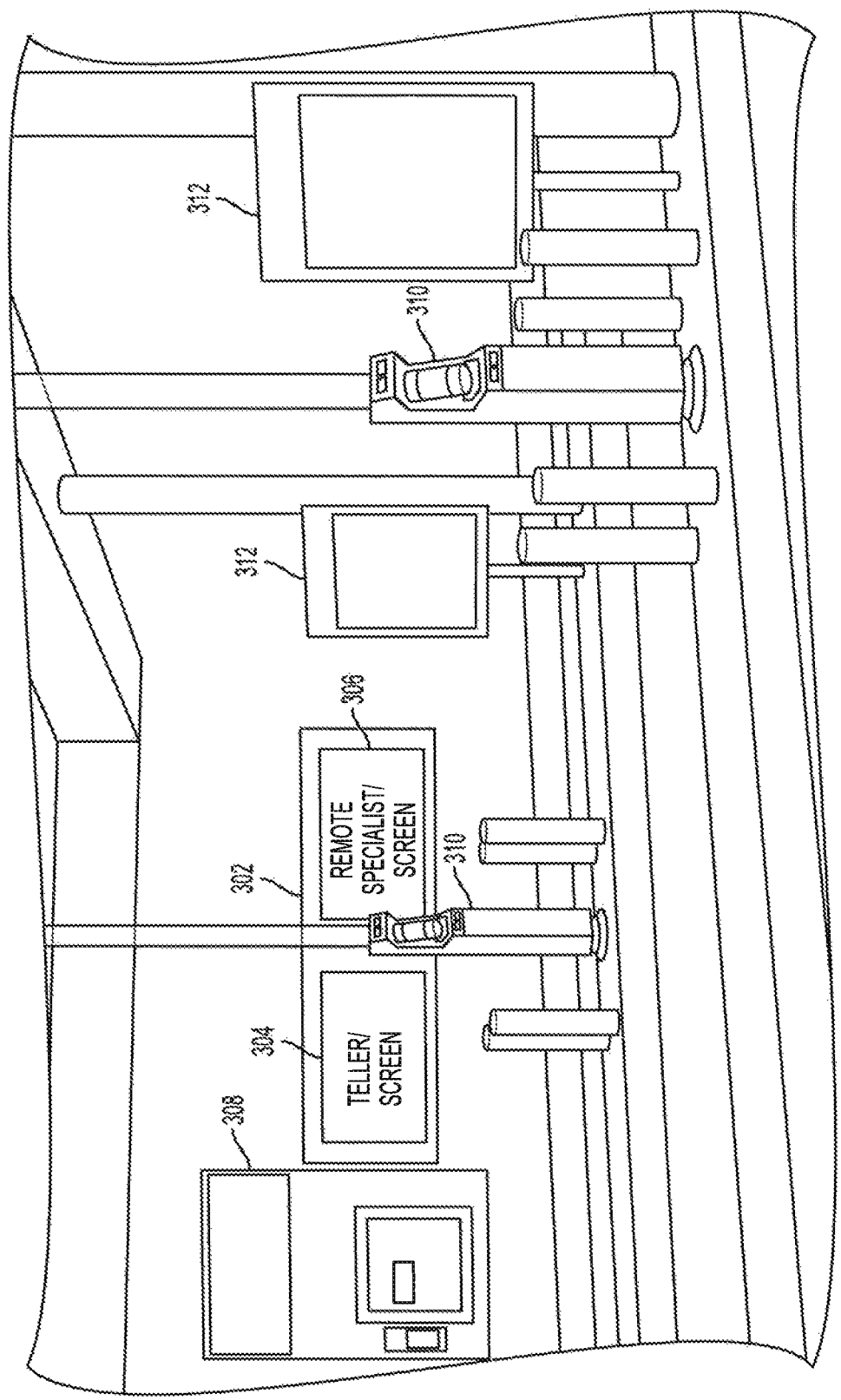
FIG. 3 shows yet another illustrative external teller window according to certain embodiments.

FIG. 3 shows another illustrative external OLED teller window. Teller window 302 may include OLED pane 304 and OLED pane 306. A customer may drive up to a pneumatic tube station 310. The customer may communicate with either a remote teller, remote specialist or a live teller upon transmitting documentation via the pneumatic tubes and audio input. The live teller may physically receive the contents of the tube, while a remote teller or specialist may receive digital images of the contents of the tube. OLED signs 312 may enable customers to view advertisements and/or remote tellers/specialists.

A customer may also utilize ATM ("Automated teller machine") 308 to perform transactions.

Figure 4:
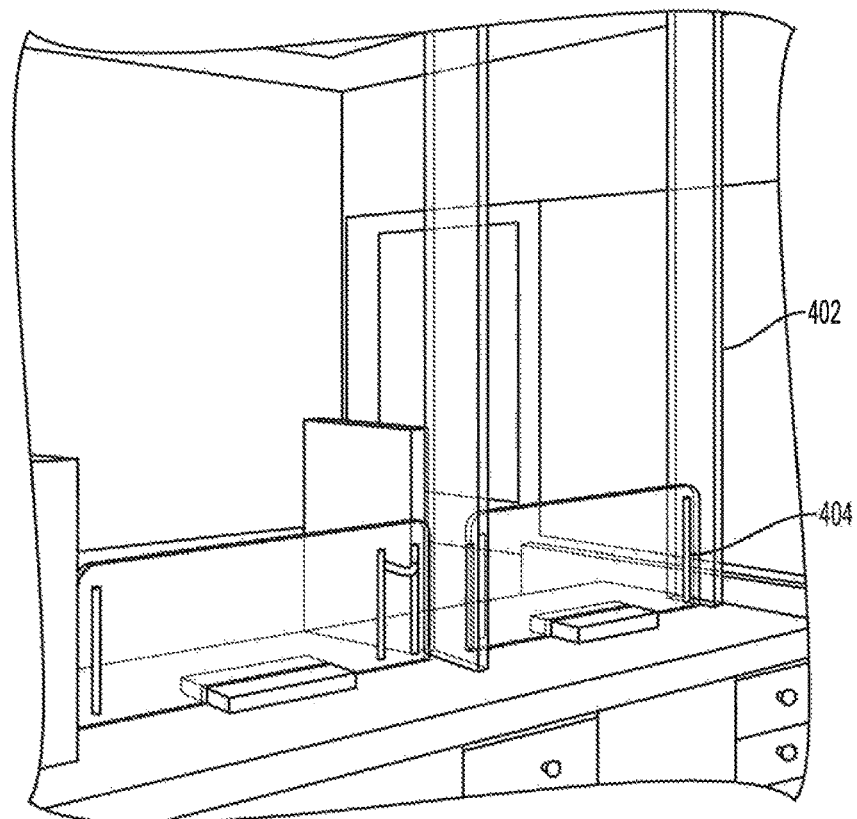
FIG. 4 shows a prior art internal teller window.

FIG. 4 shows a prior art internal teller window. A teller may sit behind window 402. A customer may sit in front of teller window 402. A customer may transmit documentation to the teller via opening 404. A customer may be able to view the teller through window 402.

Figure 5:
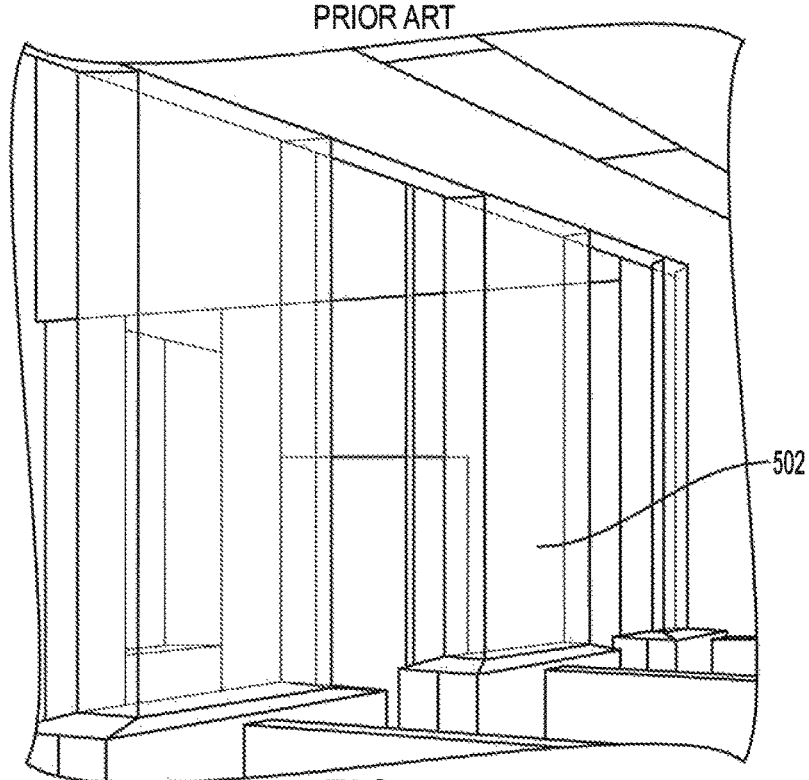
FIG. 5 shows another prior art internal teller window.

FIG. 5 shows another prior art internal teller window. Pane 502 may enable a teller to view a customer. There may be audio hookup or a microphone system that enables a customer and teller to hear each other.

Figure 6:
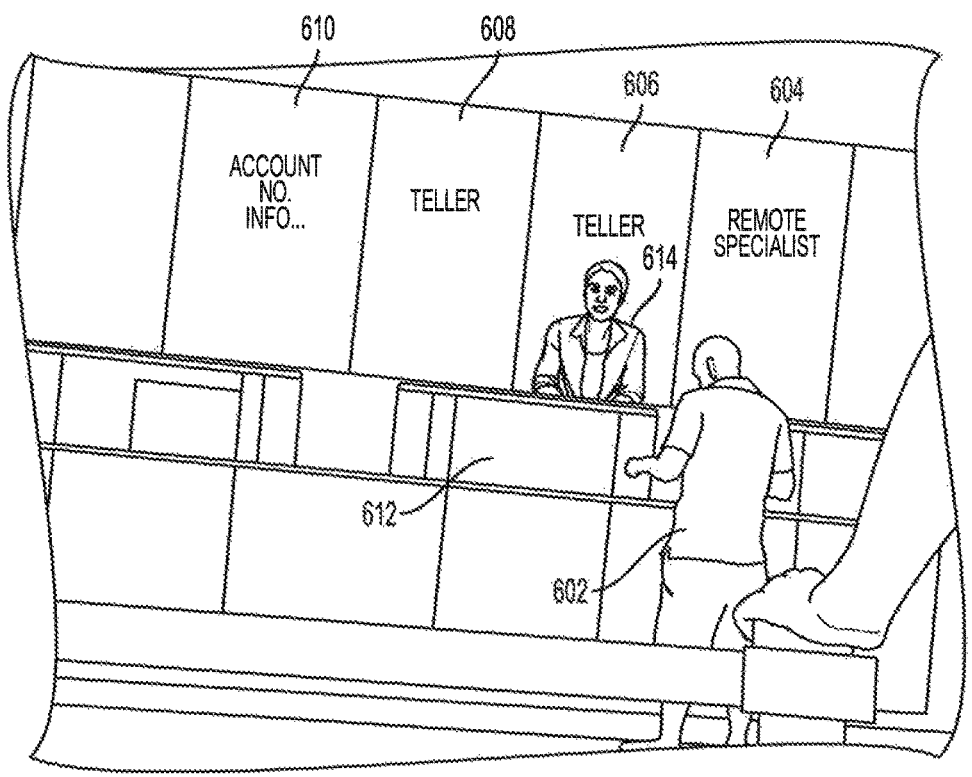
FIG. 6 shows an illustrative internal teller window according to certain embodiments.

FIG. 6 shows an illustrative internal OLED teller window. Customer 602 may want to perform a transaction. Customer 602 may bring documentation to teller counter 612. The documentation may include a deposit slip, cash, checks, a withdrawal slip, a bank card and any other suitable documentation.

Customer 602 may initiate communication with teller 614. Teller 614 may sit behind OLED pane 606. During the course of the communication, either teller 614 or customer 602 may want a third-party to join the communication. A third-party may be included for advertisement purposes—i.e., the customer may be interested in a home loan product and a third-party can introduce the options to the customer. A third-party may also be included for mediation purposes—i.e., if a customer is upset about the transaction and the teller is unable to rectify the situation, a third-party supervisor may rectify the situation. A third-party may also be included to on-board a new hire. In this instance, the third-party may only be visible on the teller side. A third-party may be included for any other suitable purpose.

As shown in FIG. 6, a remote specialist may be shown on OLED pane 604. The remote specialist may be physically at another location, such as a call center, and be shown on OLED pane 604. Also shown in FIG. 6, is another teller window, which may include transparent pane 608 and transactional information screen 610. Transparent pane 608 may enable a customer to view a teller. It should be understood that the OLED panes may have the same qualities, although the display associated with each of the panes may be determined based on necessity.

Figure 7:
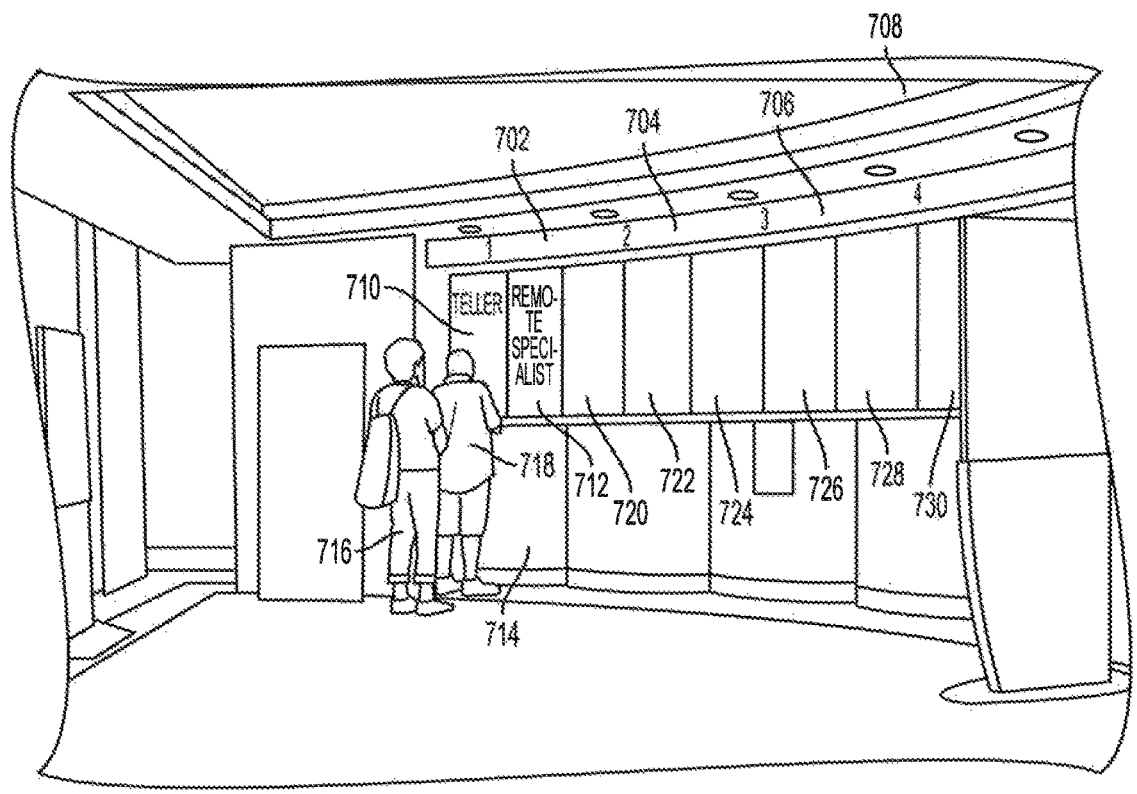
FIG. 7 shows another illustrative internal teller window according to certain embodiments.

FIG. 7 shows the interior of a financial institution. The financial institution may include teller booths 702, 704, 706 and 708. Teller booth 702 may include OLED panes 710 and 712. Teller booth 704 may include OLED panes 720 and 722. Teller booth 706 may include OLED panes 724 and 726. Teller booth 708 may include OLED panes 728 and 730. Customers 716 and 718 may be lined up in front of teller booth 702.

Customer 718 may be communicating with a teller via OLED pane 710. A remote specialist, shown on OLED pane 712 may be shown to suggest to customer 718 to open up a new account to perform his banking in a more efficient manner. The remote specialist may also be shown to the teller on an OLED pane (not shown) that backs up to OLED pane 712.

Figure 8A:
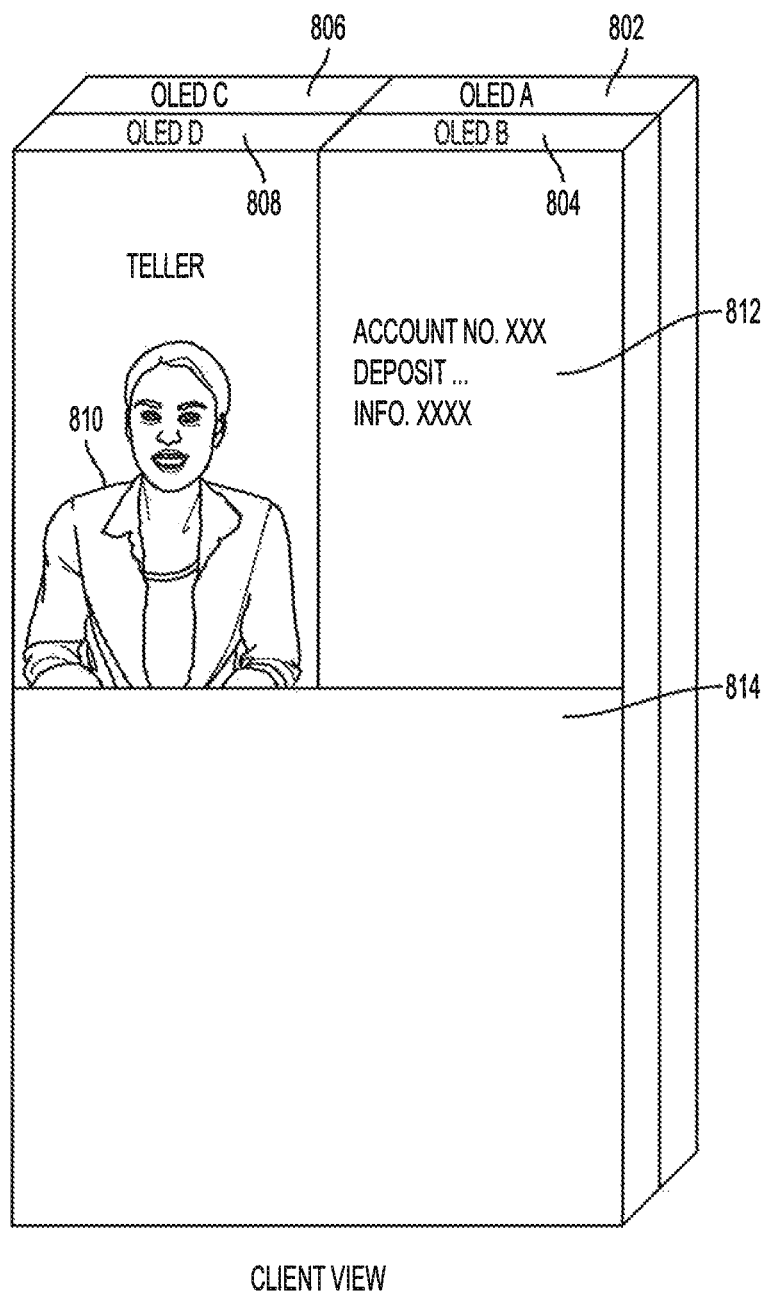
FIG. 8A shows an illustrative client-side, perspective view of a teller window according to certain embodiments.

FIG. 8A shows a transparent perspective view of OLED teller booth 814. A client may view teller 810 in OLED D 808. A client may view transaction information 812 on OLED B 804. Transaction information 812 may include account information, required documentation, a tutorial on how to complete a deposit slip, etc.

Figure 8B:
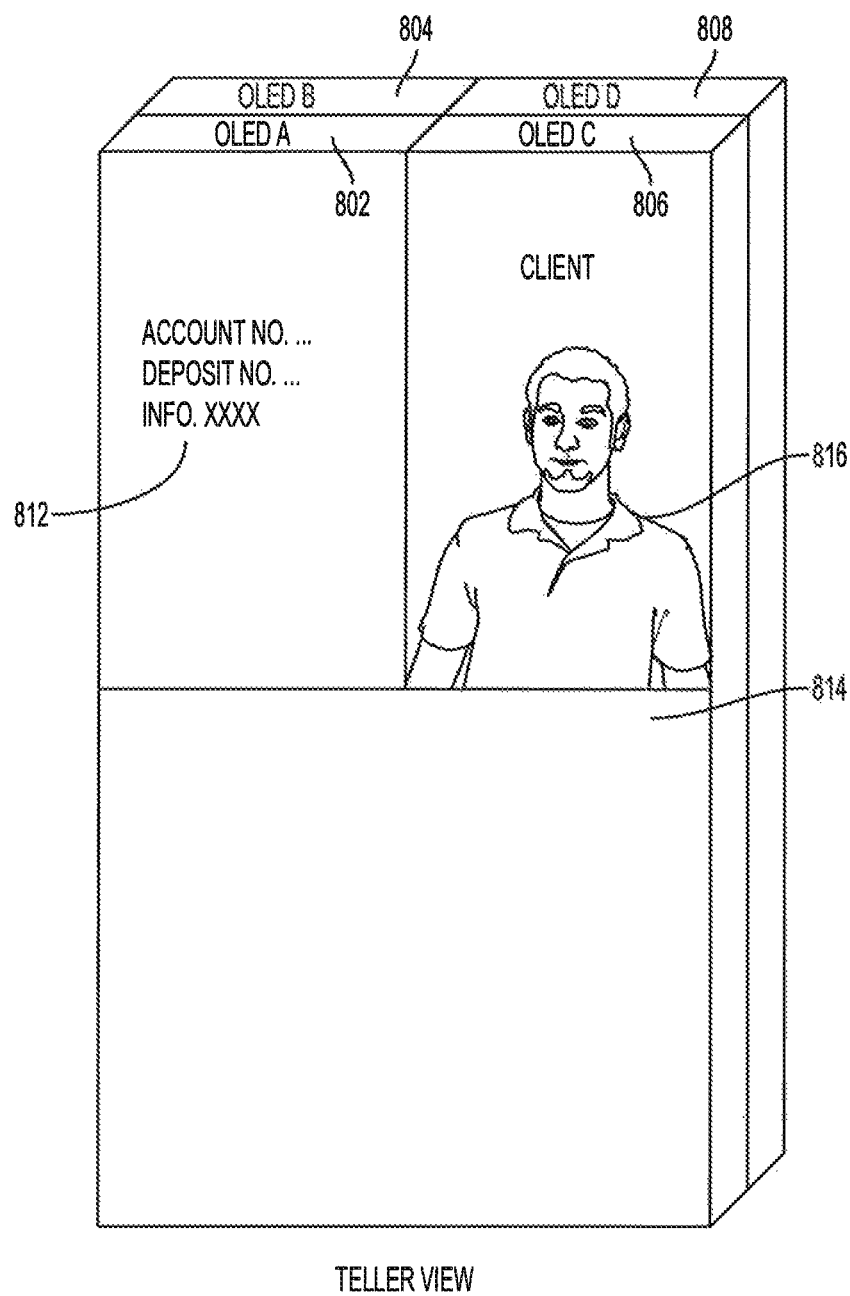
FIG. 8B shows an illustrative teller-side, perspective view of the teller window, shown in FIG. 8A, according to certain embodiments.

OLED C 806 may be facing teller 810, as shown in more detail in FIG. 8B. OLED A 802 may also be facing teller 810, as shown in more detail in FIG. 8B. It should be appreciated that each of OLEDs A-D can be powered on, powered off, display the same information, display the same video input, or display different information and/or different video input.

FIG. 8B shows a transparent, perspective view of OLED teller booth 814 from the vantage point of a teller. As shown in FIGS. 8A and 8B, both OLED A 802 and OLED B 804 show transaction information 812. This may enable both teller 810 and client 816 to view the same information on different sides of the same screen.

Figure 9:
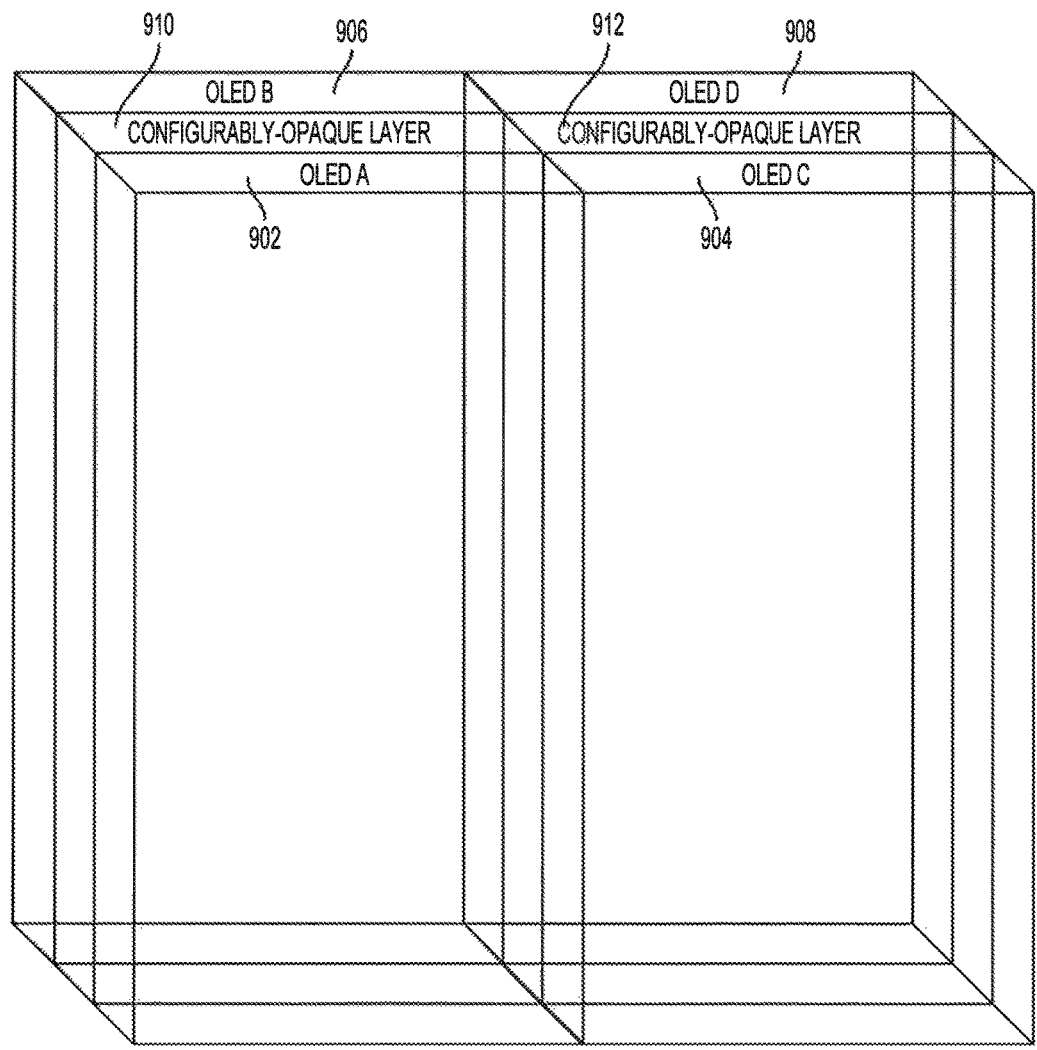
FIG. 9 shows an illustrative transparent, perspective view of a teller window.

FIG. 9 shows a transparent perspective view of an OLED teller window with a configurably-opaque layer. Configurably-opaque layer 910 may be powered on when both OLED A 902 and OLED B 906 are powered on. This may ensure that a viewer of either OLED A 902 or OLED B 906 are not disturbed by the rear OLED screen. When powered on, configurably-opaque layer 910 may be opaque. When powered off, configurably-opaque layer 910 may be translucent.

Configurably-opaque layer 912 may be powered on when both OLED C 904 and OLED D 908 are powered on. This may ensure that a view of either OLED C 904 or OLED D 908 are not disturbed by the rear OLED screen. When powered on, configurably-opaque layer 912 may be opaque. When powered off, configurably-opaque layer 912 may be translucent.

Figure 10:
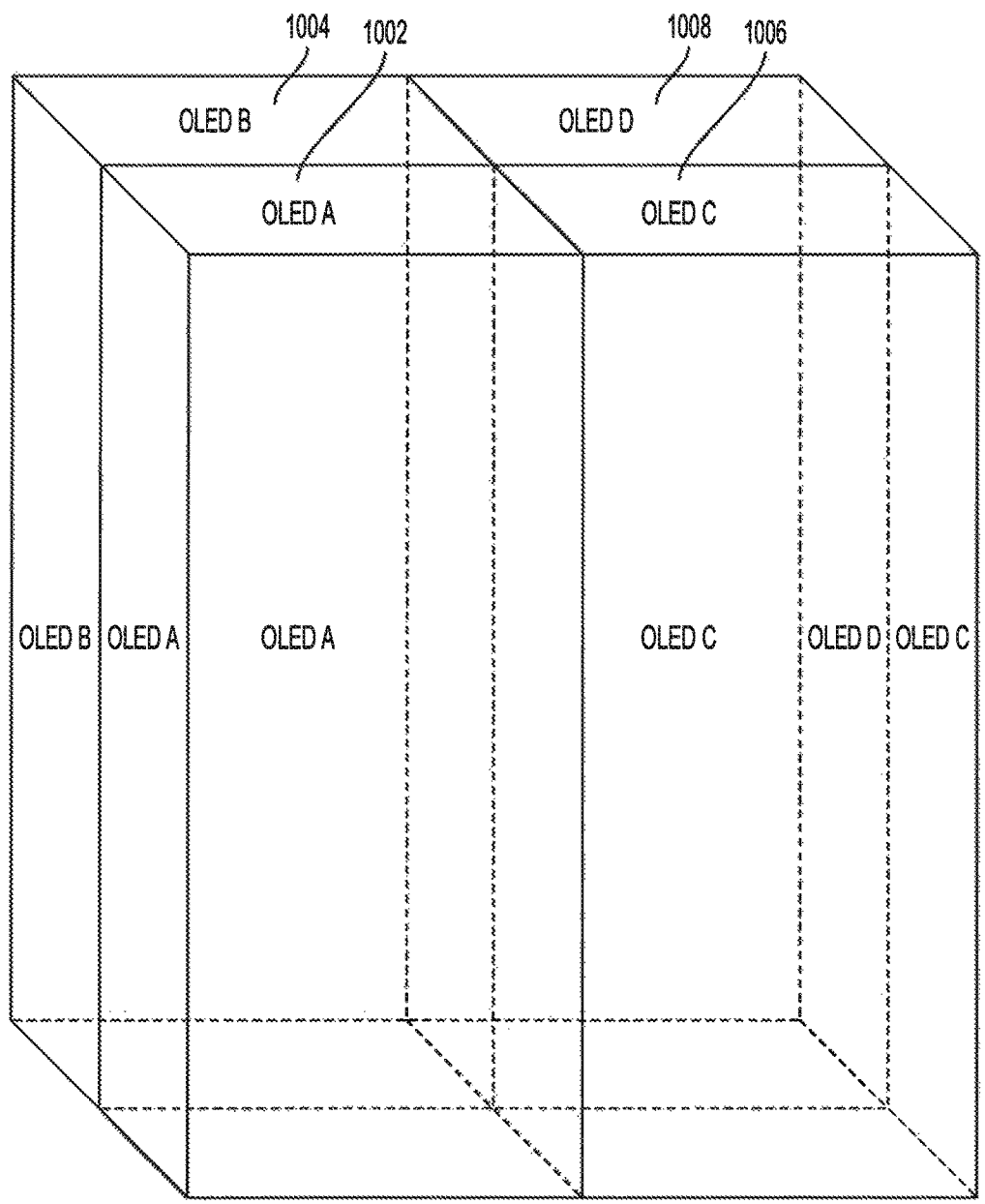
FIG. 10 shows another illustrative transparent, perspective view of a teller window.

FIG. 10 shows a transparent perspective view of a teller window without a configurably-opaque layer. In this embodiment, the powered on OLED screen itself may serve as a barrier to the rear OLED screen and may ensure that a viewer of the OLED screen is not disturbed by the rear OLED screen. OLED A 1002 may appear side-by-side with OLED C 1006. OLED B 1004 may appear side-by-side with OLED D 1008. OLED A 1002 may back up with OLED B 1004. OLED C 1006 may back up with OLED D 1008.

Figure 11:
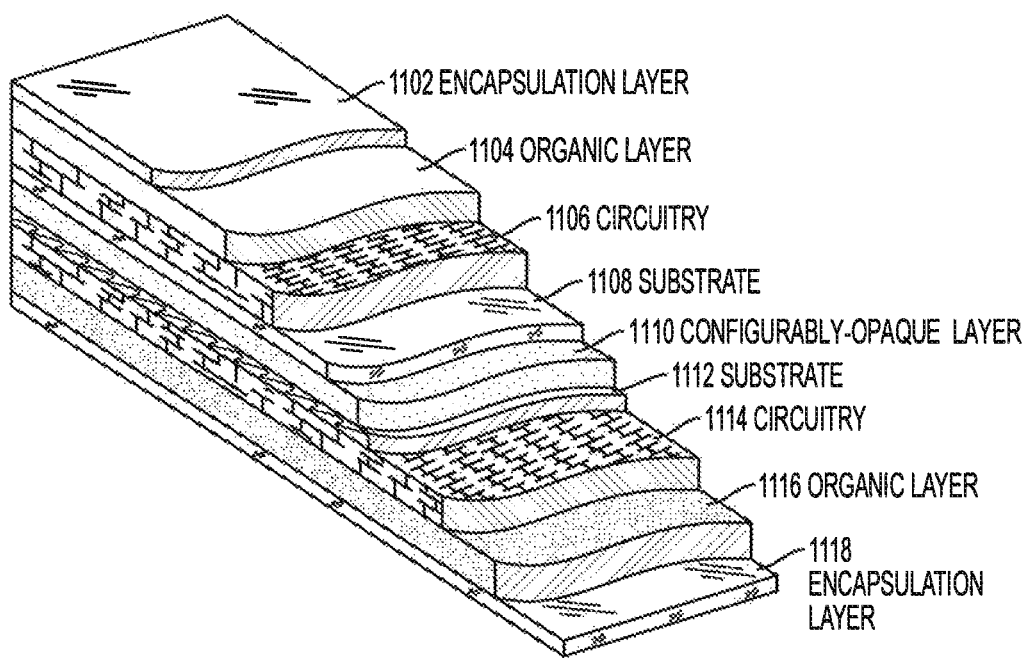

FIG. 11 shows an illustrative cutaway view of a two OLED screens with a configurably-opaque layer deployed in between. Each OLED screen may include four layers, encapsulations layers 1102 and 1118, organic layers 1104 and 1116, circuitry layers 1106 and 1114 and substrate layers 1108 and 1112. Encapsulation layers 1102 and 1118 protect the OLED layer from exposure to oxygen, water and other contaminants. Preferably, encapsulation layers 1102 and 1118 are transparent. Glass is a typical material for constructing encapsulations layers 1102 and 1118.

At times, when glass is used to construct encapsulation layers 1102 and 1118 the glass may be very thin and flexible. For example, the glass may be between 50 micrometers (μm) and 100 μm thick.

In some embodiments, encapsulations layers 1102 and 1118 may be constructed using thin-film encapsulation techniques such as Atomic Layer Deposition ("ALD"). ALD is a process that utilizes chemicals that, when deposited on a material, react to create a solid, thin film.

Organic layers 1104 and 1116 typically include an emissive solid-state semiconductor. Organic layers 1104 and 1116 may be constructed from a thin film or organic (carbon-based) material. For example, organic layers 1104 and 1116 may include one or more OLEDs. When electricity is applied to an OLED within organic layers 1104 and 1116, electrons flow through organic layers 1104 and 1116 and release photons, thereby emitting light. Different types of emissive materials may be used. Each type of material may be associated with a different color light. An intensity of light emitted by organic layers 1104 and 1116 may be controlled by the amount of electricity flowing through organic layers 1104 and 1116.

Organic layers 1104 and 1116 may be doped with "host" materials. Host materials may affect properties, such as power efficiency, of organic layers 1104 and 1116. For example, organic layers 1104 and 1116 may be doped with emitter materials that improve its operation and/or achieve a desired color.

Organic layers 1104 and 1116 may include two or more sublayers (not shown). For example, organic layers 1104 and 1116 may include 5, 10 or 15 sublayers. Illustrative sublayers may include an electronic transport layer, a blocking layer, an emissive layer, a hole transport layer and an injection layer. The sublayers may enhance an efficiency of the emissive layer.

For example, an emissive layer may be placed between a cathode and an anode. When electricity is applied, electrons flow from the cathode to the anode. OLED displays may be driven by either electrical current or voltage. In a preferred embodiment, the OLED display is driven by current. The cathode inserts electrons into the emissive layer, and the anode removes the electrons. The electron "flow" through the emissive layer releases photons, generating light. The color of the generated light may be changed by including different types of materials within the emissive layer.

A direction of light emitted by organic layers 1104 and 1116 may be controlled by a degree of transparency of the anode and/or cathode. In some embodiments, a cathode may be reflective. Such a cathode may be constructed using an aluminum-based compound or lithium fluoride. An anode may be transparent. A transparent anode may preferably be constructed using indium tin oxide. In such embodiments, when current flows between the cathode and anode, light is emitted through circuitry layers 1106 and 1114 and substrate layers 1108 and 1112. Circuitry layers 1106 and 1114 and substrate layers 1108 and 1112 may be transparent. Such embodiments may be referred to as "bottom-emitting OLEDs."

In some embodiments, the cathode may be transparent. Such a cathode may preferably be constructed using indium tin oxide. The anode may be reflective. The reflective anode may direct light toward the transparent cathode. Such embodiments may be referred to as "top-emitting OLEDs." Typically, top-emitting designs are more efficient and are used to construct higher resolution displays.

Additionally, top-emitting designs may allow organic layers 1104 and 1116 to be formed on a non-transparent substrate.

Organic layers 1104 and 1116 may form one or more pixels. Different architectures are available for forming pixels using OLEDs. One architecture includes positioning different color (e.g., red, green and blue) OLEDs adjacent to each other. Another architecture includes stacking different color OLEDs on top of each other. OLEDs may be stacked because materials used to construct organic layers 1104 and 1116 may be transparent. A stacked design may provide a smaller pixel size and higher resolution.

Circuitry layers 1106 and 1114 may include electronics that may drive one or more pixels formed within organic layers 1104 and 1116. Preferably, amorphous silicon (a-Si) and low temperature polysilicon (LTPS) may be used to construct circuitry layers 1106 and 1114. In some embodiments, circuitry layers 1106 and 1114 may be transparent.

Substrate layers 1108 and 1112 may support circuitry layers 1106 and 1114; organic layers 1104 and 1116; and encapsulation layers 1102 and 1118. Substrate layers 1108 and 1112 may be constructed using various materials. For example, substrate layers 1108 and 1112 may be constructed using glass, plastic or metal materials. In some embodiments, such as in bottom-emitting OLEDs, substrate layers 1108 and 1112 may function as encapsulation layers 1102 and 1118.

Configurably-opaque layer 1110 may function as a barrier between the first OLED and the second OLED. The configurably-opaque layer may be transparent when not in use and opaque when in use.

Thus, methods and apparatus for OLED teller windows are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for enabling an OLED ("organic, light-emitting diode"), drive-up, two-sided teller window, the method comprising:
   establishing an initiation state, wherein the entire OLED, drive-up, two-sided teller window is transparent;
   detecting a car at the OLED, drive-up, teller window;
   receiving banking information from a user of the car at the OLED, drive-up, teller window;
   powering on a first portion of the OLED, drive-up, teller window, wherein said first portion displays transaction information associated with the user of the car; and
   enabling a second portion of the OLED, drive-up, teller window to remain transparent to enable a teller, located on a side of the window opposite from the user, to make visual contact with the user.

2. The method of claim 1, wherein, when a teller is unavailable, a user-side of the second portion is powered on and displays a remote teller, said remote teller that can communicate via audio and video input, with the user.

3. The method of claim 1, wherein a teller-side of the second portion is powered on and is utilized as a banking portal computer screen.

4. The method of claim 1, wherein the teller can toggle between viewing the computer screen on the second portion and viewing the user through the second portion.

5. The method of claim 1, wherein a configurably-opaque layer sits in between a user-side of the two-sided window and a teller-side of the two-sided window, said configurably-opaque layer being transparent when idle.

6. The method of claim 5, wherein upon powering on of a user-side of the two-sided window and upon powering on of the teller-side of the two-sided window, the configurably-opaque layer is powered on.

7. The method of claim 1, wherein a user-side of the first portion is configured to display a remote specialist to the user.

8. The method of claim 7, wherein a teller-side of the first portion is configured to display the remote specialist to the teller.

9. A method for enabling a four-pane, two-sided OLED ("organic light-emitting diode") window in a teller booth, the method comprising:
   establishing an initiation state, wherein the four panes of the OLED window are transparent;
   receiving banking information from the human being at a first pane of the OLED window;
   powering on a second pane of the OLED window, said second pane being adjacent to the first pane, said second pane displaying, to the human being, transaction information associated with a transaction associated with the human being; and
   enabling the first pane and a third pane, said third pane being located in the rear of the first pane, of the OLED window to remain transparent to enable a teller, located on a side of the window opposite from the human being, to make visual contact with the human being; and
   powering on a fourth pane, said fourth pane being located in the rear of the second pane, said fourth pane displaying the transaction information to the teller.

10. The method of claim 9, wherein, when a teller is unavailable, the first pane is powered on and displays a remote teller, said remote teller that can communicate via audio and video input, with the human being.

11. The method of claim 9, further comprising:
    powering on a first configurably-opaque layer that sits between the first pane and the third pane when both the first pane and the third pane are powered on; and
    powering on a second configurably-opaque layer that sits between the second pane and the fourth pane when both the second pane and the fourth pane are powered on.

12. The method of claim 9, wherein the fourth pane is powered on and is utilized as a computer screen.

13. The method of claim 9, wherein the teller can toggle between viewing the computer screen on the fourth pane and viewing the human being through the fourth pane.

14. The method of claim 9, wherein the second pane is configured to display a remote specialist to the human being.

15. The method of claim 14, wherein the fourth pane is configured to display the remote specialist to the teller.

* * * * *